United States Patent

[11] 3,596,373

| [72] | Inventor | Glen E. Morgan<br>17901 Yorba Linda Blvd., Apt. 20, Yorba Linda, Calif. 92686 |
|---|---|---|
| [21] | Appl. No. | 825,810 |
| [22] | Filed | May 19, 1969 |
| [45] | Patented | Aug. 3, 1971 |

[54] PROGRAMMED EDUCATIONAL COMPARATOR
2 Claims, 7 Drawing Figs.

| [52] | U.S. Cl. | 35/9 |
|---|---|---|
| [51] | Int. Cl. | G09b 7/00 |
| [50] | Field of Search | 35/9, 9 A, 31 C, 35 D |

[56] References Cited
UNITED STATES PATENTS

| 1,860,895 | 5/1932 | Marx | 35/9 R |
|---|---|---|---|
| 3,070,904 | 1/1963 | Saba | 35/9 |
| 3,124,883 | 3/1964 | Kern | 35/9 |
| 3,254,431 | 6/1966 | Baker | 35/9 |

*Primary Examiner*—Wm. H. Grieb
*Attorney*—William H. Maxwell

ABSTRACT: A pair of information display boards are provided and upon each of which there is a multiplicity of information wherein each bit of information on one board is related to a bit of information on the other board. Each bit of information upon the two boards is associated with an electrical contact and the contacts thus associated with the two information boards are made comparable to each other by means of selectively replaceable circuit boards having comparable circuit continuity. Affirmation of correct comparison is by means of switching effected by simultaneously touching a pair of manipulatable probes to said contacts at the two information boards respectively, said probes being in a series circuit through a power supply and signal means.

INVENTOR.
GLEN E. MORGAN

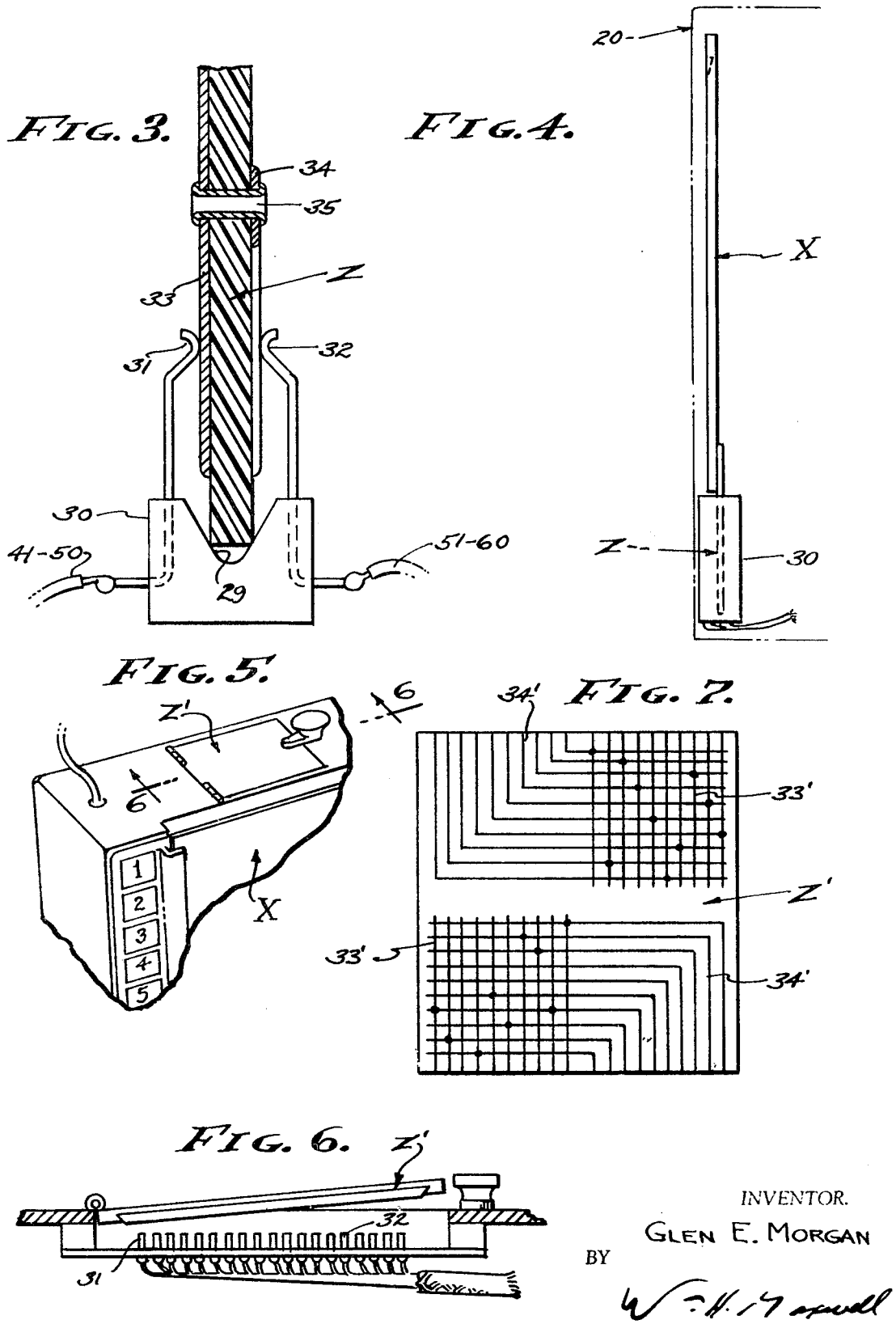

PROGRAMMED EDUCATIONAL COMPARATOR

The prior art is redundant with teaching devices and the like which utilize the infallible correctness of electrical circuitry as related to comparable information and which operate lights and/or alarms that signal a correct comparison. Such devices use one or more electrical probes through which electrical continuity is established by selecting and touching correctly related electric contacts associated with the comparable information. Such devices are characterized by boards that are prewired and which are inflexible in their operation. Notwithstanding the uneducated condition of a person in certain respects, it is possible for that person to recognize the relationships of the contacts where the board circuitry is unchangeable and repeatedly exposed to said person, and thereby guess correctly based upon operational experience, without consideration of the factual information to be compared. This result is not necessarily a method of cheating and can be practiced unknowingly, providing the same circuitry is repeatedly exposed to said person. Therefore, it is an object of this invention to provide means to program the comparator whereby bits of information upon the two boards can be rearranged relative to each other.

It is another object of this invention to provide an educational comparator of the character referred to wherein the bits of information are replaceable and/or changeable. In one form the information boards are chalk boards or flannel boards upon which the educator can selectively apply pertinent information which in his professional judgement is current and/or most appropriate to the accomplishment of his teaching objectives. With the present invention the educator can apply the comparable information according to the particular programming circuit board which he can select in each and every instance.

It is still another object of this invention to provide program means in the form of a multiplicity of circuit boards that are each distinguishable from the other with respect to continuity through the various circuits thereon. Also with respect to the circuit boards per se, they are arranged with or without indicia so that the educator can readily relate the contacts in circuit continuity for association with the related bits of information of his choosing.

It is also an object of this invention to provide an educational comparator wherein the bits of information for comparison are contained upon information boards which include the integral incorporation therein of a correct circuit board which is engaged electrically in a receptacle upon installation of the information board.

Another object of this invention is to provide an educational comparator of the type thus far referred to wherein a multiplicity of programs are supplied by means of a switch and preferably a gang switch in the form of a replaceable circuit board. With the present invention many distinct programmed arrangements of circuit continuity can be prearranged for immediate effectiveness when circumstances require.

The various objects and features of this invention will be fully understood from the following detailed description of the typical preferred forms and applications thereof, throughout which description reference is made to the accompanying drawings, in which:

FIG. 3 is an enlarged detailed fragmentary sectional view taken through a lower margin of the information and circuit board shown in FIG. 2.

FIG. 4 is an end view of the information and circuit board as it is received in a receptacle wherein electrical contact is made with the circuit board portion thereof.

FIGS. 5, 6 and 7 illustrate a second form of circuit board installation, independent of the information boards; FIG. 5 being a perspective view of a portion of the comparator shown in FIG. 1 and showing a receiver for interchangeable circuit boards. FIG. 6 being an enlarged sectional view (receiver partially opened) and taken substantially as indicated by lines 6—6 on FIG. 5, and FIG. 7 being a plan view of a typical circuit board to be accommodated in the said receiver.

Figure 2:
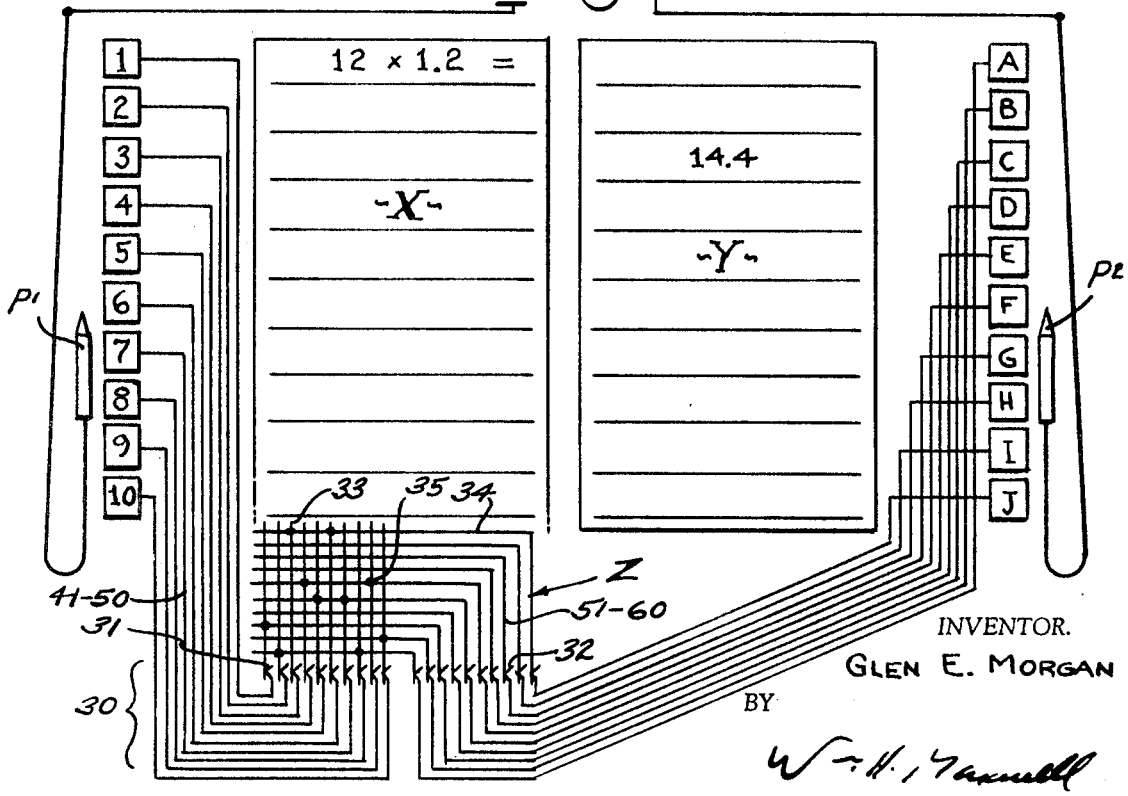
FIG. 2 is a diagrammatic view showing the electrical circuitry involved and illustrating the interchangeability of the comparable information boards and related circuit board, the circuit board being shown incorporated in one of the information boards.

The programmed educational comparator can take varied forms and is shown as a portable unit that can be hand carried in a collapsed and closed condition, and opened and set up for use as required. The unit can be completely self-contained and operative and is characterized by its ability to be modified by means of replaceable information boards X and Y and related circuit boards Z. The information boards X and Y are either blank and capable of having comparable information applied thereto according to the circuitry of a selected circuit board Z, and/or information boards X and Y are imprinted with permanent comparable information associated with a specified circuit board Z to be used therewith. It is therefore, contemplated that the circuit board Z be made integral with one or both information boards X and Y as best illustrated in the diagram of FIG. 2. Accordingly, a feature of the present invention is that the comparator is a unit that remains unchanged as a structural embodiment that becomes familiar to the persons using the same, having an apparent and obvious mode of use and operation, so as to display the comparable information boards to one or a group of persons, and subject at anytime to replacement of said elements X, Y and Z whereby complete modification of the comparator is affected. Accordingly, this educational comparator involves, generally, a frame or case 20 adapted to receive and support interchangeable information boards X and Y and circuit boards Z, a series of contacts 1—10 associated with board X, a series of contacts A-J associated with board Y, a receptacle 30 engageable electrically with the circuit board Z to establish electrical continuity (governed by the selected circuit board) through conductors 41—50 from contacts 1—10, and through conductors 51—60 from contacts A-J.

Figure 1:
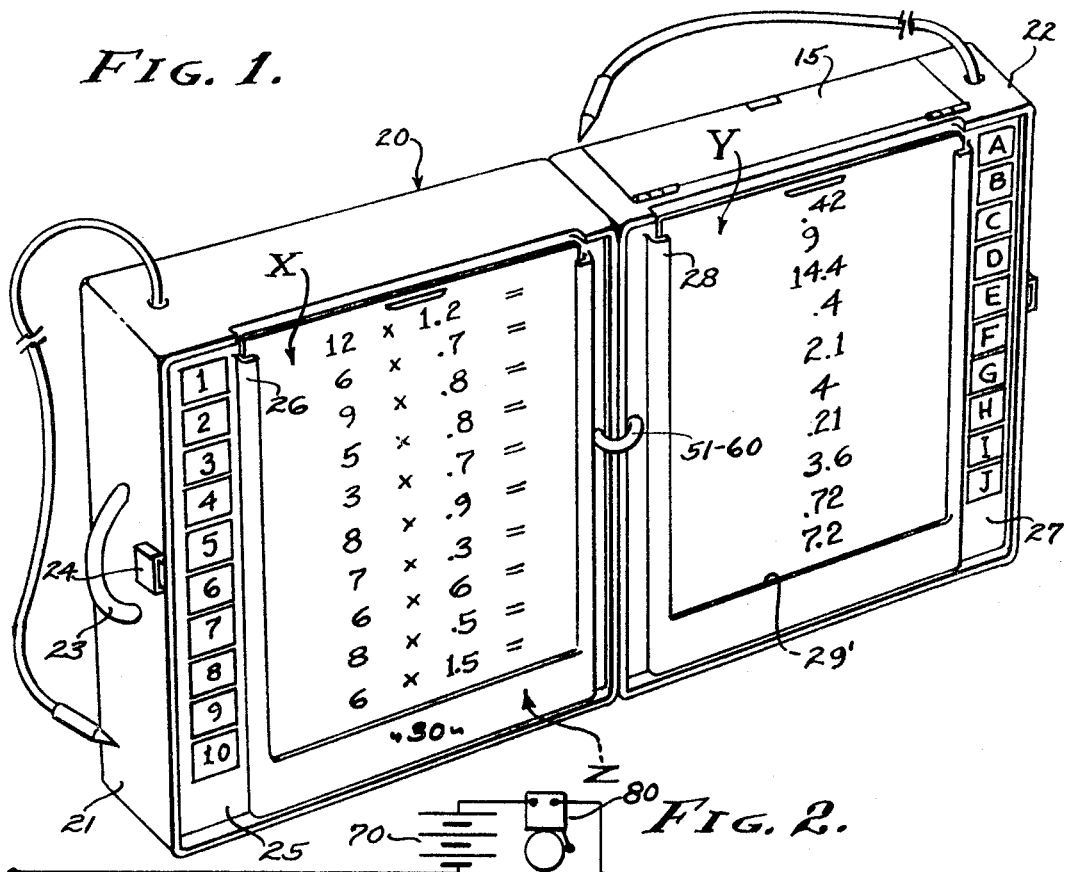
FIG. 1 is a perspective view showing a typical embodiment of the programmed educational comparator as it appears when in use.

The case 20 is preferably sectional and has two boxlike housings 21 and 22 hinged together so as to close face to face. One section is provided with a handle 23 and a lock means 24 is provided to close the case. In accordance with the invention, the face 25 of housing 21 is provided with means 26 to receive the information board X and carries the contacts 1—10 for display along one margin of said board X, while the face 27 of housing 22 is provided with means 28 to receive the information board Y and carries the contacts A-J for display along one margin of said board Y. It is preferred that the boards X and Y be arranged horizontally side by side and that the two series on contacts be arranged along remote margins of said information board. Thus, the contacts 1—10 are arranged adjacent to the left-hand margin of board X and in series of 1 to 10 from top to bottom, while the contacts A-J are arranged adjacent to the right-hand margin of the board Y and in a series of A to J from top to bottom. In practice therefore, each board X and Y contains space for 10 horizontal lines or bits of information, and the contacts are in the form of separate plates of electrically conductive material, each substantially coextensive in height with the height of each line area of information on the boards X and Y. The contacts are provided with permanent indicia 1—10 and A-J as shown. The means 26 and 28 that receive the information boards X and Y are shown in the form of opposed slides or slots that slideably embrace the opposite parallel margins of the boards, there being a stop 29 and 29' to position the lower margin of each board X and Y, as shown in FIGS. 1 and 3.

In accordance with this invention selective interchangeability of related boards X and Y and associated boards Z is provided for and which involves the electrical receptacle 30 with a contactor 31 for each of the conductors 41—50, and with a contactor 32 for each of the conductors 51—60. It is the circuit board Z and the cooperative receptacle 30 that combine to form a switch, a gang switch operative to complete all circuitry upon the one movement or insertion of the board into working position in the receptacle. In the first form as shown in FIG. 2, the contactors 31 and 32 are disposed along the lower margin of the circuit board Z which is integral with or adapted to the lower margin of information board X (or Y if desired, or both). There are 10 bits of comparable information on each board, in which case 10 comparator circuits are included in the board Z. The comparator circuits can be wired up in various manners and as shown they are comprised of a crossed network of conductive strips, one series of parallel strips 33 extended in one direction at one side of board Z, and one series of parallel strips 34 exposed in a normal direction at the other side of board Z. Any one strip 33 can, for example, be connected to one or more strips 34 by means of connectors 35, such as by means of tubular rivets applied through drilled holes penetrating the board. It will be apparent that a wide variety and substantially infinite (but limited) number of different arrangements and/or combinations of circuit continuity can be established between the two groups of 10 strips 33 and 34.

In the first form shown in FIG. 2 the circuit continuity is established by installing the information board X with its integral circuit board Z, so that each contact plate 1—10 is in circuit to a contactor 31 through a conductor 41—50 respectively, and so that each contact plate A-J is in circuit to a contactor 32 through a conductor 51—60 respectively. And an information board Y associated with board X and circuit board Z is also installed. As indicated, the contactors 31 and 32 individually engage with the strips 33 and 34, whereby electrical continuity is established between the contact plates at opposite sides of the unit and all of which is controlled by the specific information board X and circuit board Z selected.

In the second form shown in FIGS. 5, 6 and 7, the circuit continuity is established by installing a circuit board Z' especially associated with the information boards X and Y, so that each contact plate 1—10 is in circuit to a contactor 31 through a contactor 41—50 respectively, and so that each contact plate A-J is in circuit to a contactor 32 through a conductor 51—60 respectively. In this form the contactors 31 and 32 are in right angularly related series that engage with the marginal ends of right angularly related strip 33' and 34' on the circuit board Z', whereby electrical continuity is established between the contact plate at opposite sides of the unit, and all of which is controlled by the specific circuit board Z' selected. As shown, the circuit board Z' is multisided and for example has two circuits established. Thus, the board Z' is revolvable, repositionable and/or reversible into varied positions, such as a rotary switch or the like, and all of which are contemplated as equivalent switches.

In carrying out this invention, there must be an affirmation of correct comparison when made and this is accomplished by means of a pair of probes P1 and P2 in a series circuit through a power supply 70 and an alarm 80. The probes P1 and P2 are at the ends of extension cords 71 and 72 and each is a stylus having a conductive tip. A probe and stylus is taken in each hand of a person and one applied selectively to a contact plate at each information board. The electric circuitry extends flexibly between the sections of the case 20, preferably in a looped bundle that includes the conductors 51—60. The power supply 70 and alarm 80 are housed in the case 20, and all to the end that simultaneous touching of the probes P1 and P2 to the opposite comparable contact plates results in operation of said alarm. However, when noncomparative plates are engaged there is of course no signal.

From the foregoing it will be apparent that a versatile comparator is made available for educational purposes, and a unit that can be prepared in an infinite number of ways. For example, one bit of information on the board X can be related to one or more bits of information on the board Y. Both true and false or noncomparable information can be included. And above all, any one or all of the boards X, Y and Z can be interchanged with replacement boards at a moments notice and the unit reprogrammed for immediate and continued use. Consequently, teaching materials can be prearranged and/or specially arranged, and for example an educator in preparing and/or programming special questions and answers, simply makes a visual inspection of the particular circuit board Z (Z') employed, taking cognizance of the intersections of strips 33 and 34 and/or the location of connections 35 for relating comparable information through the interconnected circuitry. A supply of prepared boards X, Y and Z are stored, for example, in a compartment within one of the body sections closed by a door 15 as shown in FIG. 1. Many uses of this programmed comparator will inherently follow without limitation to subject matter of the educational or other material displayed thereby.

Having described only a typical preferred form and application of my invention, I do not wish to be limited or restricted to the specific details herein set forth, but wish to reserve to myself any modification or variations that may appear to those skilled in the art:

Having described my invention, I claim:

1. A programmed educational comparator wherein a pair of electrically operable probes are manipulated and intelligently applied to area contacts representing comparable bits of information, and including:
   a. a frame having marginal board receiving means for supporting and displaying an information and circuit board, and having two series of exposed electrical contact areas;
   b. two comparable series of receptacle contacts carried by the frame along at least one margin of the board receiving means;
   c. the information and circuit board replaceably supported on the frame by said receiving means and carrying bits of comparable information aligned with the exposed electrical contact areas adjacent the board receiving means;
   d. a program means carried by the information and circuit board and having two series of conductors interconnected in correct association with the bits of comparable information thereon, said conductors being individually connected with the two said comparable series of receptacle contacts respectively;
   e. and a pair of manipulatable electrically conductive probes in a powered circuit through an alarm means, whereby an intelligent selection of comparable information accompanied by correct engagement of said probes with exposed contact areas associated with comparable information is affirmed by said alarm means.

2. The programmed educational comparator recited in claim 1 and wherein the program means of the information and circuit board is comprised of a series of parallel and right angularly related conductor strips at opposite sides thereof, there being connectors projecting through the board to interconnect the opposite side strips, establishing circuit continuity associated with information on said information and circuit board.

UNITED STATES PATENT OFFICE
CERTIFICATE OF CORRECTION

Patent No. 3,596,373      Dated Aug. 3, 1971

Inventor(s) Glen E. Morgan

It is certified that error appears in the above-identified patent and that said Letters Patent are hereby corrected as shown below:

Glen E. Morgan
        1234 E. 55th Street
        Long Beach, California 90805

Signed and sealed this 2nd day of May 1972.

(SEAL)
Attest:

EDWARD M. FLETCHER, JR.          ROBERT GOTTSCHALK
Attesting Officer                      Commissioner of Patents